No. 865,609. PATENTED SEPT. 10, 1907.
E. F. PRICE.
PROCESS OF SMELTING REFRACTORY ORES AND PRODUCING LOW CARBON FERRO ALLOYS.
APPLICATION FILED NOV. 14, 1905.

2 SHEETS—SHEET 1.

Witnesses:

Inventor:
Edgar F. Price,
by Byrnes & Townsend
Att'ys.

No. 865,609. PATENTED SEPT. 10, 1907.
E. F. PRICE.
PROCESS OF SMELTING REFRACTORY ORES AND PRODUCING LOW CARBON FERRO ALLOYS.
APPLICATION FILED NOV. 14, 1905.

2 SHEETS—SHEET 2.

UNITED STATES PATENT OFFICE.

EDGAR F. PRICE, OF NIAGARA FALLS, NEW YORK.

PROCESS OF SMELTING REFRACTORY ORES AND PRODUCING LOW-CARBON FERRO ALLOYS.

No. 865,609.

Specification of Letters Patent.

Patented Sept. 10, 1907.

Application filed November 14, 1905. Serial No. 287,355.

*To all whom it may concern:*

Be it known that I, EDGAR F. PRICE, a citizen of the United States, residing at Niagara Falls, in the county of Niagara and State of New York, have invented certain new and useful Improvements in Processes of Smelting Refractory Ores and Producing Low-Carbon Ferro Alloys, of which the following is a specification.

This process is designed for the production of low-carbon ferrochromium, ferromanganese, ferrotitanium ferrovanadium and similar alloys, and contemplates the use of ferrosilicon as a reducing agent. It is possible to electrically produce this silicid with a silicon content of fifty percent and upwards and very low in carbon.

According to the present invention the production of low-carbon ferro-alloys is effected by a continuous operation comprising two stages. In the first stage ferrosilicon high in silicon and low in carbon is produced by electrically smelting a charge of silica, iron ore or iron, and carbon. The molten silicid is tapped from the smelting furnace and allowed to solidify. The ingot is then broken into fragments which are mixed with a granular body of the compound to be reduced, for example chromite, and the mixture is smelted preferably in a furnace in which the charge serves as a resistance-conductor. A basic flux, such as lime, is preferably mixed with the charge to convert the silica produced by the reduction of oxid ores into a fusible slag.

Suitable apparatus for carrying out the process is shown in the accompanying drawings, in which—

Figure 1:
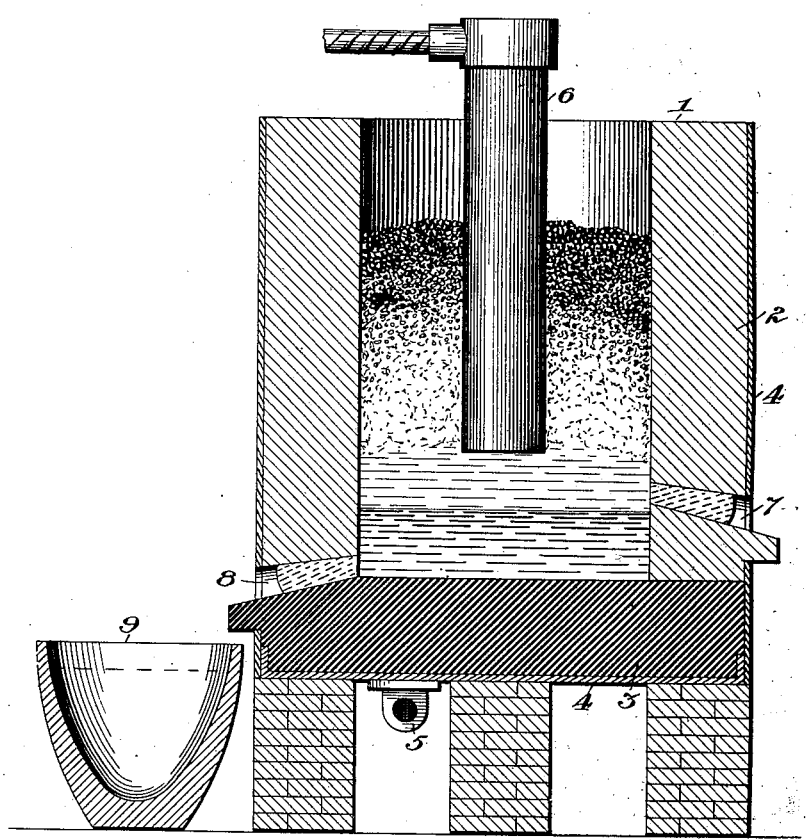
Figure 2:
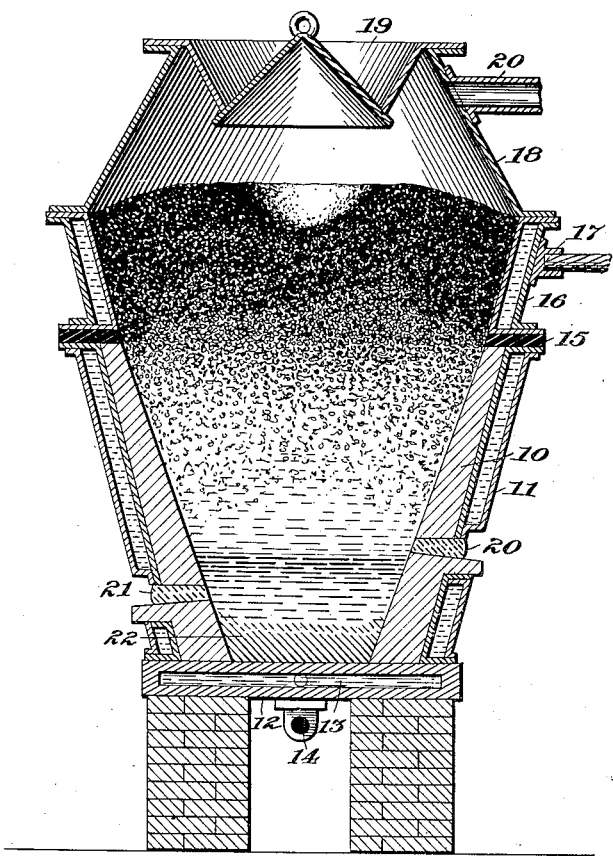

Figure 1 is an axial section of the furnace for producing the ferrosilicon; and Fig. 2 is an axial section of the resistance-furnace for utilizing the ferrosilicon to effect reduction.

The smelting-furnace shown in Fig. 1 comprises sides 2 of refractory electrically-non-conductive material, such as carborundum, siloxicon or silica, or of carbon, and a hearth 3 of carbon, surrounded by a metal casing 4 having an electric terminal 5. The carbon hearth constitutes one electrode and the other electrode is a depending carbon rod 6. Tap-holes 7, 8 extend through the side walls at different heights. In using this furnace to carry out the first stage of the process, an arc is established between the depending electrode and the carbon hearth, and the charge—for example a mixture of finely ground silica, iron ore and coke, the silica and carbon preferably being in relatively large amount—is fed into the furnace. As reduction progresses any slag is withdrawn through the tap-hole 7 and the alloy is intermittently tapped into a casting-pot 9, fresh charge-materials being added as required. In the second stage of the process, the cast ingot of ferrosilicon is broken into pieces and the fragments are mixed with the ore to be reduced and a flux. The mixture is preferably heated by the resistance-furnace shown in Fig. 2. This furnace has a body 10 of refractory non-conductive material—for example chromite or magnesia—surrounded by a water-jacket 11. The body is supported upon a horizontal metal plate 12, preferably of cast-steel, having a chamber 13 for the circulation of water, and an electric terminal 14. Supported upon the body 11 but insulated therefrom by a layer 15 of refractory non-conductive material, is the upper electrode 16, a downwardly-converging water-jacketed iron ring having a terminal 17, the inner surface of the ring being bare to contact with the charge. Supported upon the ring-electrode is an iron dome 18 which carries a bell-and-hopper charging mechanism 19 and has an outlet flue 20 for waste gases. Tap-holes 20, 21 for the slag and alloy extend through the side walls, at different heights. In employing this furnace to carry out the second stage of the process, a mixture of the ore to be reduced, for example chromite, ferrosilicon and lime, is fed into the furnace until it substantially fills the stack, the upper portion of the charge lying in contact with the ring-electrode 18. If the charge is normally a poor conductor, initial current-paths between the electrodes are provided. The conductivity of the charge may be increased by using a mixture containing large pieces of coke or ferrosilicon, which lie in contact with each other at various points and thereby afford direct current-paths. An electric current is then passed between the electrodes and through the charge, serving as a resistance-conductor. The charge is thereby heated, the temperature gradually rising toward the hearth by reason of the decreasing cross-section and increasing current and energy density, to a point where reduction is effected. The reduced iron and chromium form a molten alloy, which accumulates in a body in the lower part of the stack, this body being molten except for a layer 22 in proximity to the hearth, which is maintained in a pasty or solid condition by water circulated through the chamber 13 of the hearth. During the normal operation of the furnace, this body 22 serves as the lower electrode, the hearth 12 acting as a terminal. The slag and alloy are tapped out from time to time and more of the charge-mixture is fed into the furnace, the process thus being continuous.

This process enables a ferro-alloy containing a minimum or predetermined low percentage of carbon to be continuously produced at relatively low cost, the use of a charge containing a relatively large amount of silica and carbon producing a silicid low in carbon and serving as an effective reducing agent. While it is preferred to employ the charge as a resistance-conductor, it is obvious that the heat necessary for the final reduction may be supplied by passing an electric current through a separate resister.

I claim:—

1. The process of producing ferrochromium, which consists in smelting a charge containing ferrosilicon and a compound of chromium by means of an electrically-heated resistance-conductor, as set forth.

2. The process of producing ferrochromium, which consists in smelting a charge containing ferrosilicon, an oxidized compound of chromium, and a basic flux, by means of an electrically-heated resistance-conductor, as set forth.

3. The process of producing low-carbon ferro-alloys, which consists in smelting a charge containing ferrosilicon and a compound of a metal reducible by silicon and alloyable with iron, by passing an electric current through the charge, acting as a resistance-conductor, and thereby heating the charge to the temperature requisite for reduction, as set forth.

4. The process of producing low-carbon ferro-alloys, which consists in smelting a charge containing ferrosilicon, an oxidized compound of a metal reducible by silicon and alloyable with iron, and a basic flux, by passing an electric current through the charge, acting as a resistance conductor, and thereby heating the charge to the temperature requisite for reduction, as set forth.

5. The process of producing low-carbon ferro-alloys, which consists in smelting a charge containing ferrosilicon and a compound of a metal reducible by silicon and alloyable with iron, by passing an electric current through the charge, acting as a resistance-conductor, thereby heating the charge to the temperature requisite for reduction, withdrawing the slag and ferro-alloy from the furnace, and supplying the charge-mixture as required, as set forth.

6. The process of producing low-carbon ferro-alloys, which consists in smelting a charge containing ferrosilicon, an oxidized compound of a metal reducible by silicon and alloyable with iron, and a basic flux, by passing an electric current through the charge, acting as a resistance conductor, thereby heating the charge to the temperature requisite for reduction, withdrawing the slag and ferro-alloy from the furnace, and supplying the charge-mixture as required, as set forth.

7. The process of producing low-carbon ferro-alloys, which consists in smelting a charge containing ferrosilicon and a compound of a metal reducible by silicon and alloyable with iron, by passing an electric current through the charge, acting as a resistance-conductor, thereby heating the charge to the temperature requisite for reduction, withdrawing the slag and ferro-alloy from the furnace at different levels, and supplying the charge-mixture as required, as set forth.

8. The process of producing low-carbon ferro-alloys, which consists in smelting a charge containing ferrosilicon, an oxidized compound of a metal reducible by silicon and alloyable with iron, and a basic flux, by passing an electric current through the charge, acting as a resistance conductor, thereby heating the charge to the temperature requisite for reduction, withdrawing the slag and ferro-alloy from the furnace at different levels, and supplying the charge-mixture as required, as set forth.

9. The process of producing ferrochromium, which consists in smelting a charge containing ferrosilicon and a compound of chromium by passing an electric current through the charge, acting as a resistance conductor, and thereby heating the charge to the temperature requisite for reduction, as set forth.

10. The process of producing ferrochromium, which consists in smelting a charge containing ferrosilicon, an oxidized compound of chromium, and a basic flux, by passing an electric current through the charge, acting as a resistance conductor, and thereby heating the charge to the temperature requisite for reduction, as set forth.

11. The process of producing ferrochromium, which consists in smelting a charge containing ferrosilicon and a compound of chromium by passing an electric current through the charge, acting as a resistance conductor, thereby heating the charge to the temperature requisite for reduction, withdrawing the slag and ferro-alloy from the furnace, and supplying the charge-mixture as required, as set forth.

12. The process of producing ferrochromium, which consists in smelting a charge containing ferrosilicon, an oxidized compound of chromium, and a basic flux, by passing an electric current through the charge, acting as a resistance conductor, thereby heating the charge to the temperature requisite for reduction, withdrawing the slag and ferro-alloy from the furnace, and supplying the charge-mixture as required, as set forth.

13. The process of producing ferrochromium, which consists in smelting a charge containing ferrosilicon and a compound of chromium by passing an electric current through the charge, acting as a resistance conductor, thereby heating the charge to the temperature requisite for reduction, withdrawing the slag and ferro-alloy from the furnace at different levels, and supplying the charge-mixture as required, as set forth.

14. The process of producing ferrochromium, which consists in smelting a charge containing ferrosilicon, an oxidized compound of chromium, and a basic flux, by passing an electric current through the charge, acting as a resistance conductor, thereby heating the charge to the temperature requisite for reduction, withdrawing the slag and ferro-alloy from the furnace at different levels, and supplying the charge-mixture as required, as set forth.

15. The process of producing low-carbon ferro-alloys, which consists in smelting a charge containing ferrosilicon and a compound of a metal reducible by silicon and alloyable with iron, by passing an electric current through the charge, acting as a resistance-conductor, and increasing the current or energy density through the charge to a point where reduction is effected, as set forth.

16. The process of producing ferrochromium, which consists in smelting a charge containing ferrosilicon and a compound of chromium, by passing an electric current through the charge, acting as a resistance conductor, and increasing the current or energy density through the charge to a point where reduction is effected, as set forth.

17. The process of producing ferrochromium, which consists in smelting a charge containing ferrosilicon, an oxidized compound of chromium, and a basic flux, by passing an electric current through the charge, acting as a resistance-conductor, and increasing the current or energy density through the charge to a point where reduction is effected, as set forth.

In testimony whereof, I affix my signature in presence of two witnesses.

EDGAR F. PRICE.

Witnesses:
G. E. Cox,
D. Burgess.